UNITED STATES PATENT OFFICE.

FRIEDRICH BERGIUS, OF ESSEN-ON-THE-RUHR, GERMANY, ASSIGNOR, BY MESNE ASSIGNMENTS, TO THE CHEMICAL FOUNDATION, INC., A CORPORATION OF DELAWARE.

METHOD OF PRODUCING CHLORIN AND SULFATES FROM CHLORIDS.

1,326,634. Specification of Letters Patent. Patented Dec. 30, 1919.

No Drawing. Application filed October 28, 1914, Serial No. 869,131. Renewed May 21, 1919. Serial No. 298,787.

*To all whom it may concern:*

Be it known that I, FRIEDRICH BERGIUS, subject of the King of Prussia, and resident of Essen-on-the-Ruhr, in the Province of the Rhine, Germany, have invented a certain new and useful Method of Producing Chlorin and Sulfates from Chlorids, of which the following is a specification.

This invention relates to a process of simultaneously manufacturing chlorin and sulfates from chlorids and sulfurous acid mixed with oxygen or oxygen containing gases in a continuously working plant. My investigations have shown that it is absolutely necessary in this process to keep the temperature on the one hand so high that the whole quantity of the chlorids is converted and on the other hand so low that at any stage of the process the melting point of the mixture of chlorid and sulfate present is not attained. The process can be carried out on a commercial scale only when these precautions are taken.

In the British Specification No. 20,604 of 1893 a process has been described according to which chlorin and sulfate may be manufactured simultaneously from the above mentioned raw products at a temperature below 500° C. At this temperature, however, the reaction proceeds very slowly and in a short time a state of equilibrium results. If, however, the temperature is materially increased, the salts will become molten and the output diminished. In order to prevent this objectionable melting it has been proposed to add a certain quantity of sulfate to the chlorid. Since the melting point of the salt mass is lowered during the reaction until the eutectic mixture has been formed and then rises until the melting point of pure sulfate is attained, it is necessary to add a relatively large amount of sulfate which is objectionable. Furthermore it would be necessary to melt the salt mass before the process begins.

It has also been proposed in the German Letters Patent No. 115,250 that the salts be heated above the melting point and that, in order to prevent the melting, infusible substances be added. However it has not been possible to carry out this method on a large scale.

I have found that good results are to be obtained only by exactly regulating the temperature. The temperature is to be kept at any moment only a little below the melting point of the salt mixture present at that moment. Until the formation of the eutectic mixture it is objectionable to attain the melting of the latter (623° C.). After having passed this point I can increase the temperature according to the rising melting point of the salt mass. Furthermore I found it favorable to use the chlorid e. g. of sodium, not in briqueted state, but finely powdered.

Careful investigations of the process have shown, that the reaction is exothermic. The temperature may be controlled by regulating the speed of the gases entering the reaction chamber. The process may be carried out in such a short time that heating from the outside is not necessary. Consequently I can render my process continuous by using a rotary furnace. My process is carried out in such a manner that the gas mixture meets the salt in the counter current manner. The fresh gases are brought first in contact with a salt mass containing but little chlorid and the fresh chlorid introduced at the other end of the furnace is brought in contact with gases the conversion of which has been nearly completed. The rotary furnace must be insulated in order to avoid heat losses by radiation.

The process may be carried out for instance in the following manner:

The gases, *i. e.* a mixture of sulfurous acid and air or oxygen, which mixture may be produced in a pyrite furnace or otherwise, are introduced into an inclined rotary furnace at its lower opening, the furnace having been previously charged with finely divided chlorid of sodium. At this end of the furnace the reaction is to be initiated by heating above 500° C. The reaction being initiated proceeds in an exothermic manner and therefore a further heating is unnecessary. During the reaction the rotation of the furnace produces a forward movement of the converted salt in a downward direction and while the produced sulfate of sodium is removed from the lower opening new quantities of chlorid are introduced at the upper opening. Here the produced chlorin gas is removed. The process is carried out according to the well known counter current principle. The temperatures in the furnace are regulated by removing the hot gaseous products of the reaction at different speeds.

Compared with the prior art my process possesses the following advantages:

(1). I avoid the use of substances which do not participate in the reaction so that a pure sulfate is produced.

(2). The yield is identical with the theoretical.

(3). The reaction goes to completion in a relatively short time and may be carried out continuously.

Furthermore I have found that by the same process sulfuryl chlorid may be produced when an excess of $SO_2$ gas is employed.

What I claim is:

1. The method of simultaneously producing chlorin and a sulfate which consists in treating a chlorid with sulfurous acid and available oxygen and maintaining the temperature above 500° C. but at all times lower than the melting point of the salt mass.

2. The method of simultaneously producing chlorin and a sulfate which consists in treating a chlorid with sulfurous acid and available oxygen and varying the temperature so that at all times it will be just below the melting point of the salt mass.

3. The method of simultaneously producing chlorin and a sulfate which consists in treating a chlorid with sulfurous acid and available oxygen, maintaining the temperature lower than the melting point of the salt mass and increasing the temperature as the melting point of the salt mass increases due to the formation of the sulfate.

4. The method of simultaneously producing chlorin and a sulfate which consists in treating a chlorid with sulfurous acid and available oxygen, and maintaining the temperature below the melting point of the salt mass by the effect of the gas current upon the salt mass.

5. The method of simultaneously producing chlorin and a sulfate which consists in bringing sulfurous acid and available oxygen into contact with a chlorid according to the counter-current principle.

6. The method of simultaneously producing chlorin and a sulfate which consists in treating a finely powdered chlorid with sulfurous acid and available oxygen and varying the temperature so that at all times it will be just below the melting point of the salt mass.

FRIEDRICH BERGIUS.

Witnesses:
H. E. W. HEINRICH,
T. HENDLEY REED.